US00RE37931E

(19) United States
(12) Reissued Patent
Gueret

(10) Patent Number: US RE37,931 E
(45) Date of Reissued Patent: Dec. 10, 2002

(54) DEFORMABLE APPLICATOR WITH CAPILLARY FEED

(75) Inventor: Jean-Louis H. Gueret, Paris (FR)

(73) Assignee: L'Oreal, Paris (FR)

(21) Appl. No.: 09/985,586

(22) Filed: Nov. 5, 2001

Related U.S. Patent Documents

Reissue of:
(64) Patent No.: 5,492,426
Issued: Feb. 20, 1996
Appl. No.: 08/194,919
Filed: Feb. 14, 1994

(30) Foreign Application Priority Data

Feb. 22, 1993 (FR) ..... 93 01985

(51) Int. Cl.[7] ..... A45D 34/00; A45D 40/20
(52) U.S. Cl. ..... 401/126; 401/119; 401/130; 401/148
(58) Field of Search ..... 401/119, 126, 401/130, 123, 148

(56) References Cited

U.S. PATENT DOCUMENTS

| | | | |
|---|---|---|---|
| 742,201 | A | 10/1903 | Lindemeyer |
| 1,534,259 | A | 4/1925 | Dempsey |
| 3,554,657 | A | 1/1971 | Aston |
| 3,951,157 | A | 4/1976 | Idec |
| 4,101,225 | A | 7/1978 | Linz et al. |
| 4,796,647 | A | 1/1989 | Gueret |
| 4,850,727 | A | 7/1989 | Gueret |
| 5,482,191 | A | 1/1996 | Kaufman |
| 5,636,931 | A | 6/1997 | Gueret |

FOREIGN PATENT DOCUMENTS

| | | |
|---|---|---|
| DE | 92 07 228.3 | 8/1992 |
| DE | 41 15 275 | 11/1992 |
| EP | 0263329 | 4/1988 |
| EP | 0 380 182 | 8/1990 |
| FR | 1131324 | 2/1957 |
| FR | 1329881 | 12/1965 |
| FR | 2 256 739 | 8/1975 |
| FR | 2 314 686 | 1/1977 |
| FR | 2 486 375 | 1/1982 |
| FR | 2 603 780 | 3/1988 |
| GB | 12662 | of 1909 |

OTHER PUBLICATIONS

English Abstract for 22 56 739.

*Primary Examiner*—David J. Walczak
(74) *Attorney, Agent, or Firm*—Finnegan, Henderson, Farabow, Garrett & Dunner, LLP

(57) ABSTRACT

Applicator including a reservoir containing a substance to be applied, a cap intended to close the reservoir and supporting a stopper including an applicator holder supporting a deformable element for applying the substance. The deformable element has a shape memory, i.e., can return to its original shape after being deformed, and a roughened surface. The reservoir holding the substance includes an endpiece having a base equipped with a seat including at least one capillary orifice against which the deformable element deforms when the reservoir is closed by the cap.

16 Claims, 3 Drawing Sheets

FIG.3
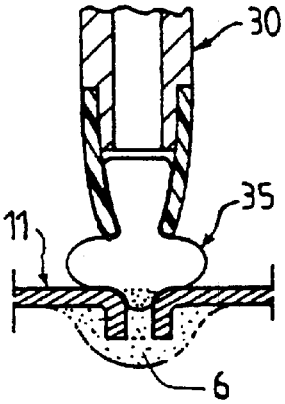
FIG. 4
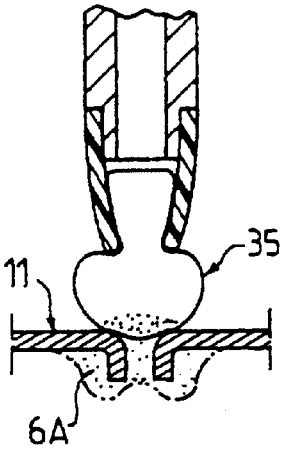
FIG.5
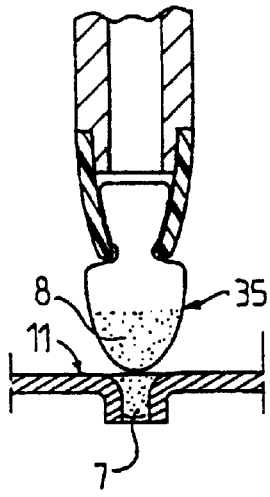
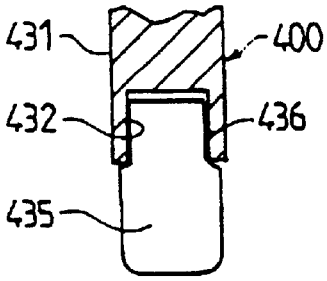
FIG.9
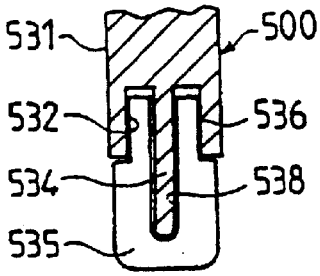
FIG.10
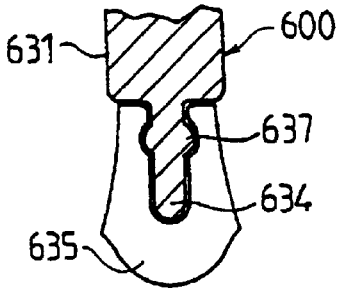
FIG.11
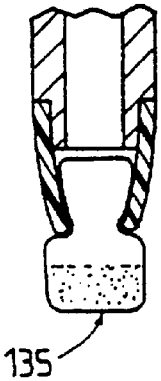
FIG.6
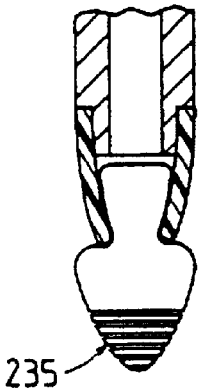
FIG.7
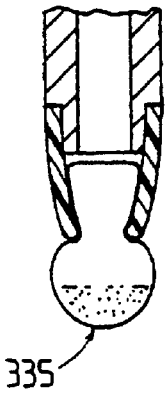
FIG.8

DEFORMABLE APPLICATOR WITH CAPILLARY FEED

Matter enclosed in heavy brackets [ ] appears in the original patent but forms no part of this reissue specification; matter printed in italics indicates the additions made by reissue.

BACKGROUND OF THE INVENTION

The present invention relates to an applicator intended for local treatment of the skin; such a treatment is, for example, treatment for spots or for blotches. The aim of the invention is to provide an applicator which is capable of delivering an infinitesimal dose directly to the skin in a very precise manner and of additionally permitting the massage of the skin.

SUMMARY OF THE INVENTION

According to the present invention, such an applicator includes a reservoir which contains a substance to be applied, a cap which is intended to close the reservoir, and an applicator holder supporting a deformable element for applying the substance, the element being made of foam or of low-hardness elastomer, and is characterized by the fact that the deformable element has a roughened surface and is provided with a substantial shape memory, and in that the reservoir holding the substance is limited by a finger-shaped capillary end-piece having a base equipped with a seat which is pierced with at least one capillary orifice against which the deformable element is applied and deformed in the position in which the reservoir is closed by the cap.

The application element advantageously includes a foam with open cells which communicate with one another when the deformable element is not deformed.

By virtue of this arrangement, when the deformable element is compressed on the seat of the base of the capillary end-piece, its surface in contact with the seat is increased; when the applicator is opened, that is to say when the cap is separated from the reservoir, the deformable element recovers its initial shape which it has in the free state and creates a suction effect which draws up the drop of substance, held hitherto by capillary on that face of the base of the capillary end-piece which is opposite the one bearing the seat, on account of the presence of the capillary orifice.

The design of the applicator according to the invention permits, in a simple manner, the provision of several functions. The deformable element compressed on the seat ensures the sealing of the reservoir. The considerable shape memory of the deformable element permits the function of pumping and suctioning of the substance. The flexibility of the deformable element permits a local massage of the skin.

The capillary orifice, of which there is at least one, is advantageously circular and its diameter is between 0.5 and 3 mm; alternatively, the capillary orifice, of which there is at least one, is a slit having a cross-section of between 0.2 and 7 $mm^2$.

The end of the deformable element which cooperates with the seat and the orifice is flat, or in the shape of a conical tip, or round.

The applicator holder supporting the deformable element preferably includes a hollow rod; alternatively, it includes a rigid support sleeve in the shape of an ogive.

According to another alternative, the applicator holder includes, a rigid solid rod; the solid rod is advantageously equipped, at its end, with a stiffening element of elongate shape for guiding the deformable element during its deformation.

The capillary end-piece is supported by a spacer element which is integral with the reservoir and through which the applicator holder passes.

According to a preferred embodiment, the capillary orifice opens into the reservoir along a flared, frustoconical portion which serves as a capillary reservoir. The dimensions of the capillary orifice will be adjusted depending on the viscosity of the substance to be applied.

The capillary end-piece is advantageously made of semi-rigid material; alternatively, the end-piece is made of a rigid material.

BRIEF DESCRIPTION OF THE DRAWINGS

In order to permit a better understanding of the subject-matter of the invention, a description will now be given, by way of a purely illustrative and non-limiting example, of an embodiment thereof which is shown in the attached drawings:

In the drawings:

FIGS. 3 to 5 are partial sections showing the respective positions of the deformable element during the functioning as a capillary pump;

FIGS. 6 to 8 each show an alternative of the deformable element for an applicator according to the invention;

FIGS. 9 to 11 each show an alternative of the applicator holder supporting an alternative of the deformable element, for an applicator according to the invention;

DESCRIPTION OF THE PREFERRED EMBODIMENTS

Figure 1:
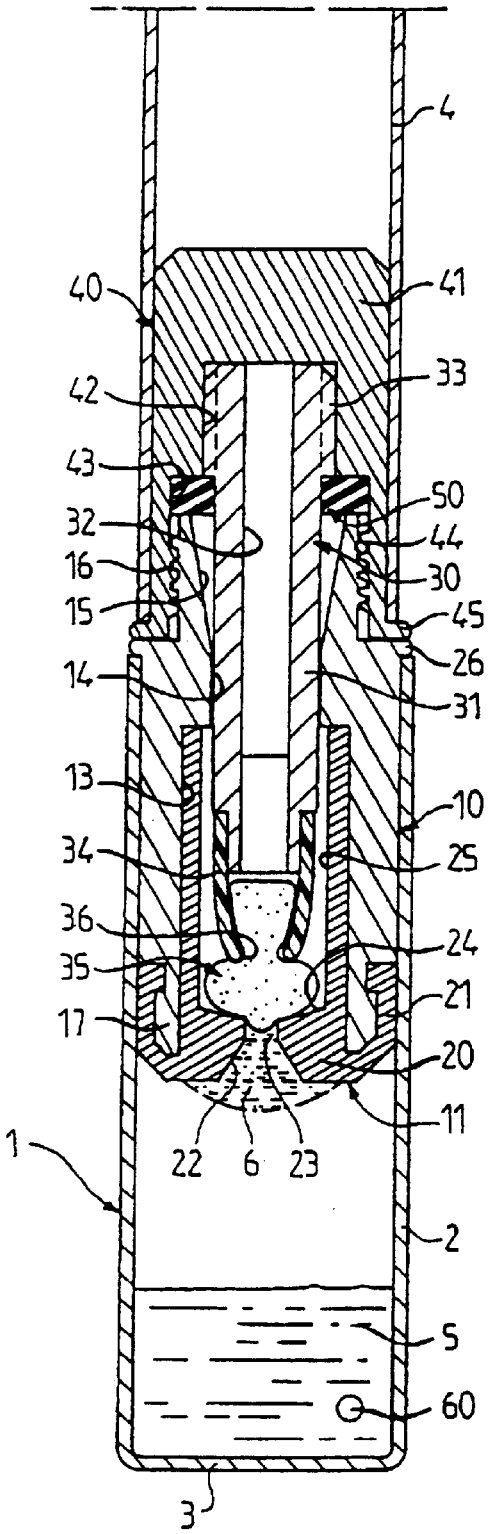
FIG. 1 is a partial sectional view of an applicator according to the invention.

According to FIG. 1, an applicator 1 includes a reservoir 2 in the shape of a cylinder which has a base and is open at one end; a spacer element 10 of the same cross-section as the reservoir 2 is force-fitted through this end until a flange 26 of the spacer element 10, of an external diameter equal to the external diameter of the reservoir 2, abuts the frontal outer edge of the opening of the reservoir 2.

The spacer element 10 supports a finger-shaped end-piece 11; to do this, the spacer element 10 includes an axial cylindrical recess 13 extended via a coaxial passage 14 of smaller diameter, which is itself extended via a flared area 15 opening to the outside; in line with this flared area 15, the spacer element 10 has an external thread 16 on the surface of a cylindrical end portion which is of a smaller diameter than that of the part of the spacer element 10 fitted in the reservoir 2.

At the end of the spacer element 10 distinct from the end which has the thread 16, the spacer element 10 is equipped with an annular bulge 17 for snap-in fitting; the end piece 11 is housed in the cylindrical 13; the end-piece 11 is in the shape of a finger and defines a cylindrical chamber 25 and a base 20: the base 20 has a seat 24 pierced with a capillary orifice 23; the base 20 is bordered by a flange 21 for snap-fitting which is of a shape complementary to that of the annular bulge 17 of the spacer element 10, allowing the end-piece 11 to be joined to the spacer element 10 by snap-fitting. The base 20 of the end-piece 11 is at a distance from the base 3 of the reservoir 2 for a substance 5 to be applied.

The applicator 1 also includes a cap 4 represented partially in the figures; the cap 4 is also in the shape of a cylinder which has a base (not represented) and is open at one end; a stopper 40 having the same cross-section as the cap 4 is force-fitted through this end, the cap 4 itself having a cross-section similar to that of the reservoir 2; the stopper 40 is fitted into the cap 4 until a flange 45 of the stopper 40 abuts the outer edge of the opening of the cap 4. The stopper 40 has a top 41 in which there is formed a cavity 42 extended via a bore 43 of greater diameter which has on the inside a thread 44 complementary to the thread 16 of the spacer element 10.

The stopper 40 is integral with an applicator holder 30 supporting a deformable application element 35 made in this example, of a foam; the applicator holder 30 includes a hollow rod 31; pierced with a bore 32, one end of which has longitudinal 33 for holding the rod 31 in the cavity 42 of the top 41 by forcefitting. The other end of the rod 31 is equipped with a rigid supporting sleeve 34 in the shape of an ogive holding the deformable element 35 via its end of smaller diameter defining of constriction 36. In an alternative which is not represented, the deformable element 35 is held directly by the hollow rod 31. The deformable element 35 is made of a material having a considerable shape memory.

In the position represented in FIG. 1, the applicator is closed; the cap 4 is screwed onto the reservoir, a seating joint 50 being placed around the rod 31, between the stopper 40 and the spacer element; in this closure position, the deformable element 35 is crushed against the seat 24 and the orifice 23. A ball 60 is housed in the reservoir 2 and permits agitation of the substance 5, if necessary. The orifice 23 opens into the reservoir 2 along a flared, frustoconical portion 22. By virtue of the capillary orifice 23, whose diameter is of the order of 0.5 to 3 mm, a drop 6 of substances adheres by capillarity to the surface of the base 20 opposite the seat 24.

Figure 2:
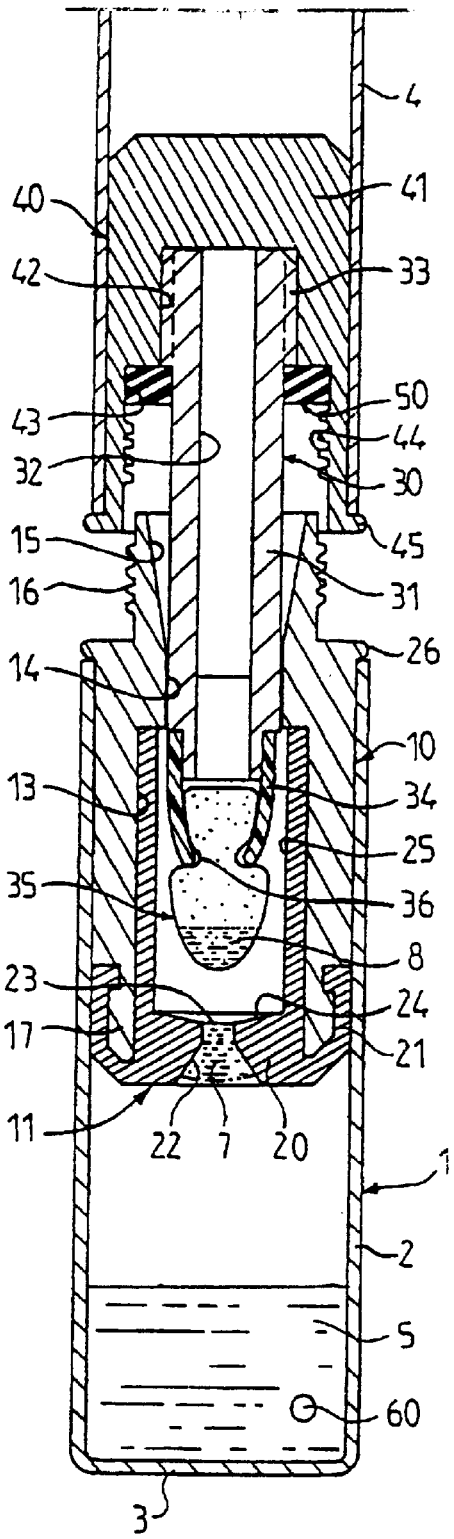
FIG. 2 is similar to FIG. 1, but the applicator is shown in the open position.

FIG. 2 shows the applicator 1 in an open position, just before use; in this position, which corresponds to a position in which the cap 4 is drawn back with respect to the reservoir 2, the deformable element 35 has recovered its initial position; the deformable element 35 is charged with a part 8 of the drop 6 of substance, the remainder 7 of the substance obstructing the orifice 23 in which it is held by capillarity.

The manner in which the deformable element 35 is charged with substance is illustrated in FIGS. 3 to 5; in these figures, the base of the end-piece 11, in which the capillary orifice 23 is formed, has been represented diagrammatically. FIG. 3 corresponds to the closed applicator, the drop 6 of substance being held by capillarity; FIG. 5 corresponds to the position in which the deformable element 35 is charged with a part 8 of the drop 6 of substance 5, the orifice being obstructed by the remainder 7 of the substance 5; FIG. 4 corresponds to an intermediate position in which a drop 6A is smaller than the drop 6 in FIG. 3, the deformable element 35 having begun to be charged with substance, as it gradually recovers its original shape.

The deformable element 35 can have different shapes at rest: thus, according to FIG. 6, the deformable element 135 has a flat end; according to FIG. 7, the deformable element 235 has the shape of a rounded conical tip; according to FIG. 8, the deformable element 335 has a spherical end.

The deformable element has a roughened surface which can be of any type: it can include a large number of protrusions separated by small cavities, or of fine circular and parallel grooves, as illustrated in FIG. 7.

According to the alternatives in FIGS. 9 to 11, the applicator holder 400, 500, 600 includes a solid rod 431, 531, 631 whose end is shaped to support the deformable element 435, 535, 635, here preferably made of low-hardness elastomer; low-hardness elastomer is understood to mean an elastomer whose hardness is between 15 Shore A and 70 Shore A. This elastomer is made up of open-cell foam.

According to FIG. 9, the solid rod 431 has, at its end, a cylindrical recess 432 in which an end 436 of the deformable element 435 is tightly fitted.

According to FIG. 10, the solid rod 531 has, at its end, an annular cylindrical recess 532 bordered at the center with a stiffening element 534 of elongate shape, along the axis of the rod 531, the axial length of the stiffening element 534 being greater than that of the recess 532; the deformable element 535 has a cavity 538 of a shape complementary to that of the stiffening element 534 on which it is engaged tightly, the end 536 of the element 535 being likewise fitted tightly in the recess 532; the stiffening element 534 makes it possible to guide the deformable element 535 during its deformation.

According to FIG. 11, the solid rod 631 has, at its end, a stiffening element 634, without the annular recess in the preceding alternative; a radial protrusion 637 with which the stiffening element 634 is equipped permits a better axial support of the deformable element 635.

Figure 12:
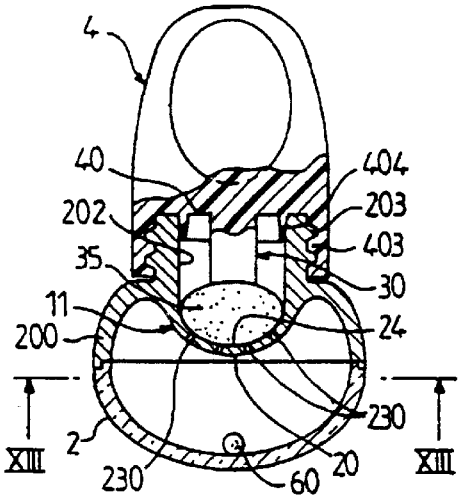
FIG. 12 is a partial sectional view of an alternative of the applicator according to the invention.
Figure 16:
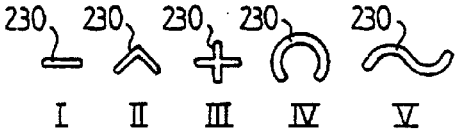
FIGS. 16/I to 16/V show different cross-sectional shapes of the capillary orifice.
Figure 13:
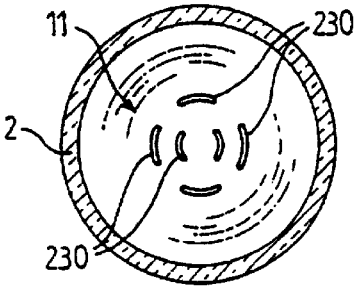
FIG. 13 is a view along XIII—XIII in FIG. 12.
Figure 17:
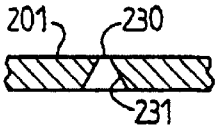
FIGS. 17 and 18 represent, in longitudinal section, two alternatives of the capillary orifice.
Figure 18:
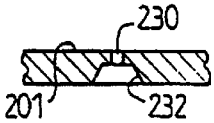

FIGS. 12 and 13 show an alternative of the applicator in which the capillary end-piece 11, which limits the substance reservoir 2, is equipped with a seat 24 pierced with several capillary slits 230, six slits in the shape of arcs of a circle in the example represented in these figures; these slits can of course have, in cross-section, any suitable shapes, such as, for example, those represented in FIGS. 16/I to 16/V; these slits can have, in longitudinal section of the base 201; frustoconical shapes 231, as shown in FIG. 17, or partially frustoconical shapes 232, as shown in FIG. 18, in such a way as to form a reserve of substance. The end-piece 11 in this alternative is made of a rigid material and has threads 203 on the outer surface of an upper part 202 thereof; the upper part 202 is extended downwards via a flared skirt 200 surrounding the seat 24, being at a radial distance from the latter; the skirt 200 covers the reservoir 2, of the hemispherical-shaped type, and is made integral with the reservoir 2, for example by adhesive bonding; the reservoir 2 is advantageously made of a transport material. The threads 203 of the end-piece 11 cooperate with threads 403 on the cap 4, which also has, on the inner face of its upper part, an annular sealing lip 404 for sealed closure of the capillary end-piece 11, the lip 404 surrounding a solid transverse wall constituting the stopper 40.

Figure 14:
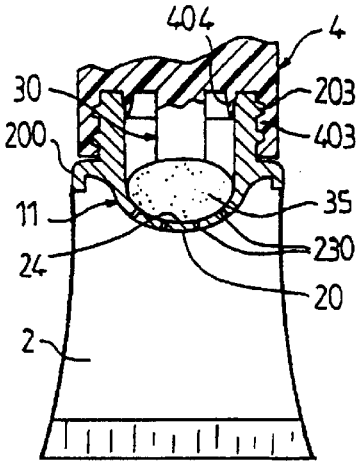
FIG. 14 is a partial sectional view of an alternative of the applicator according to FIG. 12.

According to FIG. 14, the applicator is similar to that in FIG. 12, except that the reservoir 2 is a flexible tube connected to the flared skirt 200, which is in the case shorter than that in the alternative in FIG. 12.

Figure 15:
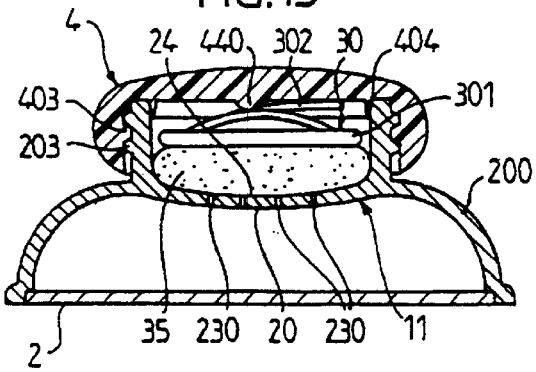
FIG. 15 is a partial sectional view of another applicator according to the invention.

According to FIG. 15, the applicator includes an applicator holder 30 which is not integral with the cap 4; the applicator holder 30, which supports the deformable element 35, is made of a plate 301 on one face of which the element 35 is secured, while the other face of the plate 301 bears a grip 302, the applicator holder 30 thereby constituting a sort of powder puff application. The cap 4 has, on the inner face of its upper part, a central rib 440 intended to cooperate with the grip 302, by means of which the applicator holder 30 is applied on the seat 24 when the cap 4 is screwed on to the upper part of the end-piece 11, by cooperation of the threads 203 and 403 on, respectively, the capillary end-piece 11 and the cap 4; the cap 4 also has, on the inner face of its upper part, an annular sealing lip 404 for sealed closure of the capillary end-piece 11; a transverse plate closes the skirt 200 at its lower part in order to form the reservoir 2.

Figure 19:
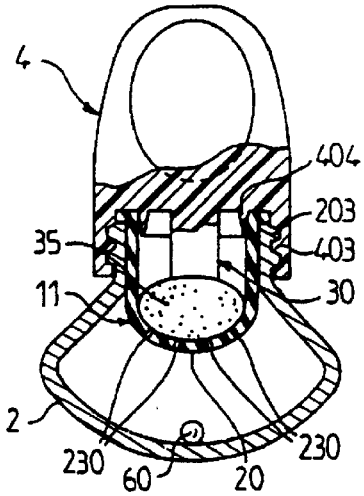
FIG. 19 is a partial sectional view of another alternative of the applicator according to the invention.

According to FIG. 19, the applicator is of the same type as the applicators described with reference to FIGS. 12 to 15, except that the capillary end-piece 11 is made of semi-rigid material, secured in the neck of the reservoir 2, the capillary end-piece 11 being a component distinct from the reservoir 2, as described with reference to FIGS. 1 to 11.

I claim:

1. Applicator comprising:

a reservoir for containing a substance to be applied;

a cap engageable with the reservoir for closing the reservoir; and an applicator holder supporting a deformable element for applying the substance, said deformable element being movable between a first configuration when the cap is disengaged from the reservoir, and a second configuration deformed relative to the first configuration, when the cap is engaged with and closes the reservoir, wherein the deformable element has a roughened surface, and wherein the reservoir includes an end-piece having a base equipped with a seat including a capillary orifice against which the deformable element is applied,

*wherein the deformable element* assumes the second deformed configuration when the reservoir is closed by the cap, and collects through capillary action the substance.

2. Applicator according to claim 1, wherein the capillary orifice is circular and has a diameter between 0.5 and 3 mm.

3. Applicator according to claim 1, wherein the capillary orifice is a slit having a cross-section of between 0.2 and 7 $mm^2$.

4. Applicator according to claim 1, 2 or 3, wherein an end of the deformable element which cooperates with the seat and the orifice is flat.

5. Applicator according to claim 1, 2 or 3, wherein an end of the deformable element which cooperates with the seat and the orifice is conical.

6. Applicator according to claim 1, 2 or 3, wherein an end of the deformable element which cooperates with the seat and the orifice is round.

7. Applicator according to claim 1, 2 or 3, wherein the applicator holder supporting the deformable element comprises a hollow rod.

8. Applicator according to claim 7, wherein the applicator holder supporting the deformable element comprises a rigid support sleeve in the shape of an ogive.

9. Applicator according to claim 1, 2 or 3, wherein the applicator holder supporting the deformable element comprises a solid rod.

10. Applicator according to claim 9, wherein the solid rod is equipped, at an end thereof, with a stiffening element of elongate shape for guiding the deformable element during movement between the first and second configurations.

11. Applicator according to claim 1, 2 or 3, wherein the end-piece is supported relative to the reservoir by a spacer element which is integral with the reservoir and through which the applicator holder passes.

12. Applicator according to claim 1, 2 or 3, wherein the orifice opens out in the reservoir along a flared, frustoconical portion which serves as a capillary reservoir.

13. Applicator according to claim 1, 2 or 3, wherein the end-piece is made of semi-rigid material.

14. Applicator according to claim 1, 2 or 3, wherein the end-piece is made of a rigid material.

15. Applicator according to claim 1, 2 or 3, wherein the deformable element is made of a low-hardness elastomer in the form of an open-cell foam.

*16. Applicator according to claim 1, wherein the seat includes a plurality of capillary orifices against which the deformable element is applied.*

* * * * *

UNITED STATES PATENT AND TRADEMARK OFFICE

CERTIFICATE OF CORRECTION

PATENT NO. : RE 37,931 E
DATED : December 10, 2002
INVENTOR(S) : Jean-Louis Gueret It is certified that error appears in the above-identified patent and that said Letters Patent is hereby corrected as shown below:

Column 5,
Line 24, after "Applicator" insert -- , --.

Signed and Sealed this

Eleventh Day of March, 2003

JAMES E. ROGAN
*Director of the United States Patent and Trademark Office*